US010093018B2

(12) United States Patent
Reinhart

(10) Patent No.: US 10,093,018 B2
(45) **Date of Patent: *Oct. 9, 2018**

(54) TOOL HOLDER

(71) Applicant: Creative Plastic Concepts, LLC, Sycamore, OH (US)

(72) Inventor: Nickolas Reinhart, Findlay, OH (US)

(73) Assignee: Creative Plastic Concepts, LLC, Sycamore, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/838,740

(22) Filed: Dec. 12, 2017

(65) Prior Publication Data

US 2018/0099405 A1 Apr. 12, 2018

Related U.S. Application Data

(63) Continuation of application No. 15/192,161, filed on Jun. 24, 2016, now Pat. No. 9,844,870.

(60) Provisional application No. 62/183,939, filed on Jun. 24, 2015.

(51) Int. Cl.

| | |
|---|---|
| ***B23Q 3/00*** | (2006.01) |
| ***B25H 1/12*** | (2006.01) |
| ***B25H 3/00*** | (2006.01) |
| ***B25H 1/06*** | (2006.01) |

(52) U.S. Cl.
CPC ................ *B25H 1/12* (2013.01); *B25H 1/06* (2013.01); *B25H 3/00* (2013.01)

(58) Field of Classification Search
USPC .......... 269/16, 309; 206/372, 373, 374, 375
See application file for complete search history.

(56) References Cited

U.S. PATENT DOCUMENTS

| | | | | |
|---|---|---|---|---|
| 4,773,535 | A * | 9/1988 | Cook | A45C 3/00 206/373 |
| 5,647,453 | A * | 7/1997 | Cassells | E06C 7/14 182/129 |
| 5,988,383 | A | 11/1999 | Armstrong | |
| 6,305,498 | B1 * | 10/2001 | Itzkovitch | B25H 1/06 182/129 |
| 7,055,652 | B1 | 6/2006 | Williams | |
| 8,177,029 | B1 * | 5/2012 | Norton | B25H 3/02 182/129 |
| 8,844,717 | B1 | 9/2014 | Ross | |
| 9,402,477 | B2 * | 8/2016 | Chang | A47B 97/00 |
| 2002/0092785 | A1 | 7/2002 | Lungo | |

* cited by examiner

*Primary Examiner* — Joseph J Hail
*Assistant Examiner* — Shantese McDonald
(74) *Attorney, Agent, or Firm* — Jacob M. Ward; Ward Law Office LLC

(57) ABSTRACT

A tool holder comprises a first pair of opposing sides and a second pair of opposing sides. The second pair of opposing sides is disposed intermediate the first pair of opposing sides. The tool holder includes an at least one pocket attached to at least one of the sides. A first pair of straps connect a top edge of each of the first pair of opposing sides. The tool holder is configurable between an expanded position and a collapsed position.

20 Claims, 5 Drawing Sheets

TOOL HOLDER

CROSS-REFERENCE TO RELATED APPLICATIONS

This application is a continuation of U.S. patent application Ser. No. 15/192,161, filed on Jun. 24, 2016, and issued as U.S. Pat. No. 9,844,870 on Dec. 19, 2017, which in turn claims the benefit of U.S. Provisional Application No. 62/183,939, filed on Jun. 24, 2015. The entire disclosures of the above applications are hereby incorporated herein by reference.

FIELD

The present disclosure relates to tool holders, and more particularly, to tool holders configured for use with sawhorses, work benches, trestles, tables, and related structures.

BACKGROUND

Support systems such as sawhorses have long been used in the construction trade, providing a beam with four legs used to support construction materials for sawing. A pair of sawhorses can support a plank, providing an easily made scaffold. Two sawhorses can also be used to easily form a work surface, through placement of a sheet of plywood or door on top thereof.

Sawhorses typically include a crossbeam attached across a top of two sets of legs. The sawhorse is collapsible, wherein the first set of legs is folded towards the second set of legs to allow the sawhorse to be stored in a substantially flat configuration.

To maximize portability and minimize weight, space between the legs of the sawhorse is generally empty. Thus, although functional for supporting a work piece, a majority of the sawhorse structure goes unutilized.

Due to the portable nature of sawhorses, they are commonly used in off-site environments lacking organizing means, such as tool boxes and shelving. As a result, workers are often required to either keep their tools on a tool belt, set tools on the ground, or maintain tools in a vehicle tool box. Each of these organizing means are undesirable, as they require workers to carry unnecessary weight, result in disorganization, or result in extra trips back and forth to a vehicle tool box, respectively.

There is a continuing need in the art for a means of utilizing the sides of a sawhorse to provide a storage spaced. Desirably, the means permits for storage of many different types of tools and supplies.

SUMMARY

In concordance with the instant disclosure, means of utilizing the sides of a sawhorse to provide a storage spaced, and which permits for storage of many different types of tools and supplies, is surprisingly discovered.

A tool holder comprises a first pair of opposing sides and a second pair of opposing sides. The second pair of opposing sides is disposed intermediate the first pair of opposing sides. The tool holder includes an at least one pocket attached to at least one of the sides. A first pair of straps connect a top edge of each of the first pair of opposing sides. The tool holder is configurable in an expanded position and in a collapsed position.

DRAWINGS

The above, as well as other advantages of the present disclosure, will become readily apparent to those skilled in the art from the following detailed description, particularly when considered in the light of the drawings described hereafter.

DETAILED DESCRIPTION

Figure 1:
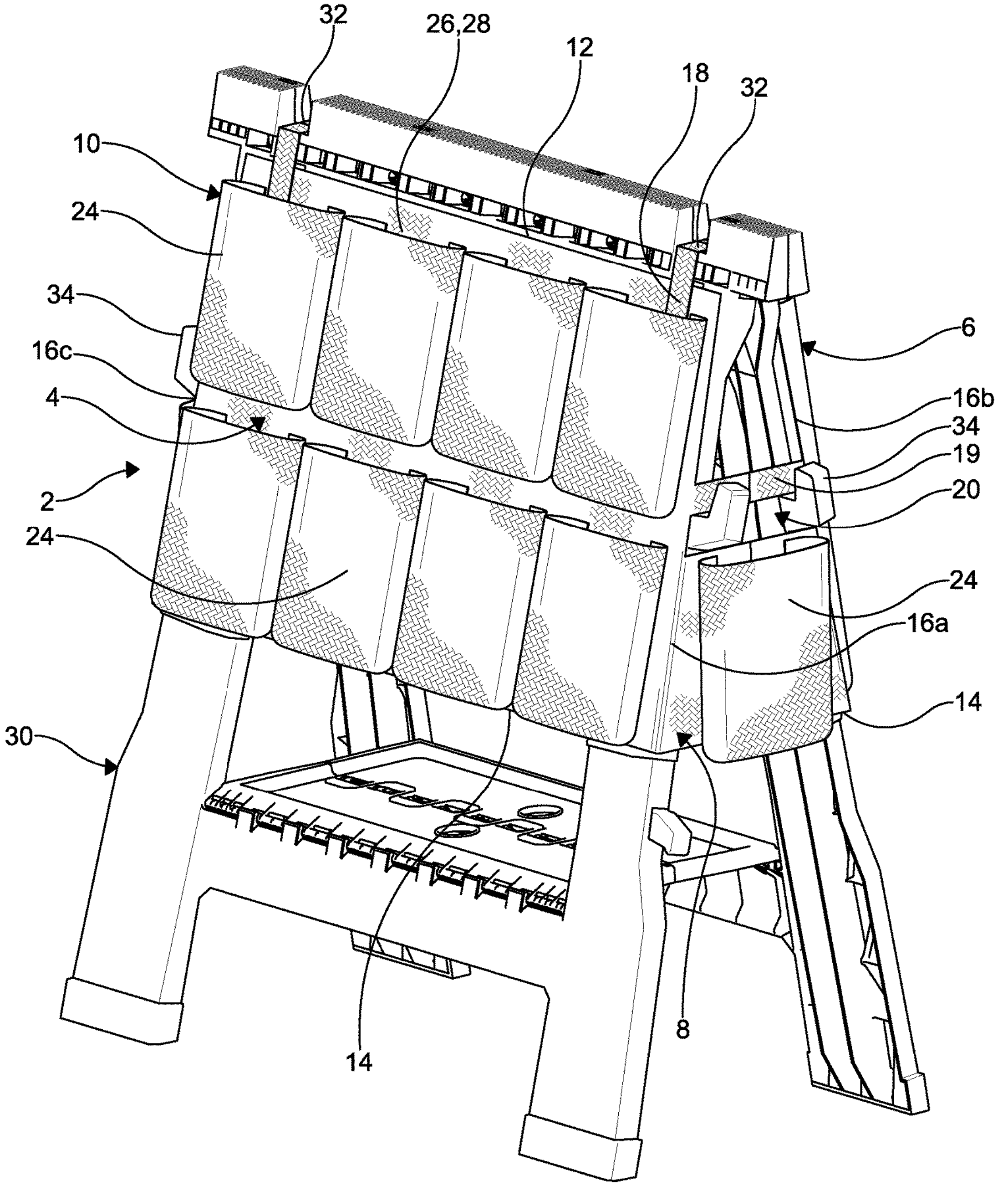
FIG. 1 is a perspective view of a tool holder according to one embodiment of the present disclosure, the tool holder fitted to a collapsible sawhorse.

The following description is merely exemplary in nature and is not intended to limit the present disclosure, application, or uses. It should also be understood that throughout the drawings, corresponding reference numerals indicate like or corresponding parts and features. In respect of the methods disclosed, the order of the steps presented is exemplary in nature, and thus, is not necessary or critical.

In FIGS. 1-5, a tool holder 2 according to various embodiments of the present disclosure is shown. Although the tool 2 is described primarily herein with respect to sawhorses, it should be appreciated that the tool holder 2 of the present disclosure can be used on any type of support structure such as, but not limited to, tables, work benches, desks, and the like. Similarly, although the tool holder 2 is described herein as being molded from a flexible thermoplastic material, a skilled artisan may select any suitable material for the tool holder 2 including non-thermoplastic cloth or fabric, as desired.

As shown in FIGS. 1-5, the tool holder 2 includes a first side 4 and an opposing second side 6. The tool holder 2 may further include a third side 8 and opposing fourth side 10. Each of the sides 4, 6, 8, 10 is formed of a flexible thermoplastic material. The sides 4, 6, 8, 10 may be provided as panels of the flexible thermoplastic material that are subsequently connected by sewing, for example. As non-limiting examples, the tool holder 2 may be formed from a woven or non-woven plastic fabric such as nylon, polyethylene, polypropylene, or the like. A skilled artisan will appreciate that the sides 4, 6, 8, 10 can be formed from a variety of other suitable materials within the scope of the disclosure.

Each of the first side 4 and the second side 6 includes a top edge 12, a bottom edge 14, and a pair of opposing ends 16*a-d*. The third side 8 and the fourth side 10 are disposed intermediate the first side 4 and the second side 6. The third side 8 attaches the first end 16*a* of the first side 4 to the first end 16*b* of the second side 6. The fourth side 10 attaches the second end 16*c* of the first side 4 to the second end 16*d* of the second side 6. In the illustrated embodiment, the third side 8 and the fourth side 10 are attached adjacent the bottom edge 14 of the first side 4 and bottom edge 14 of the second side 6.

Figure 2:
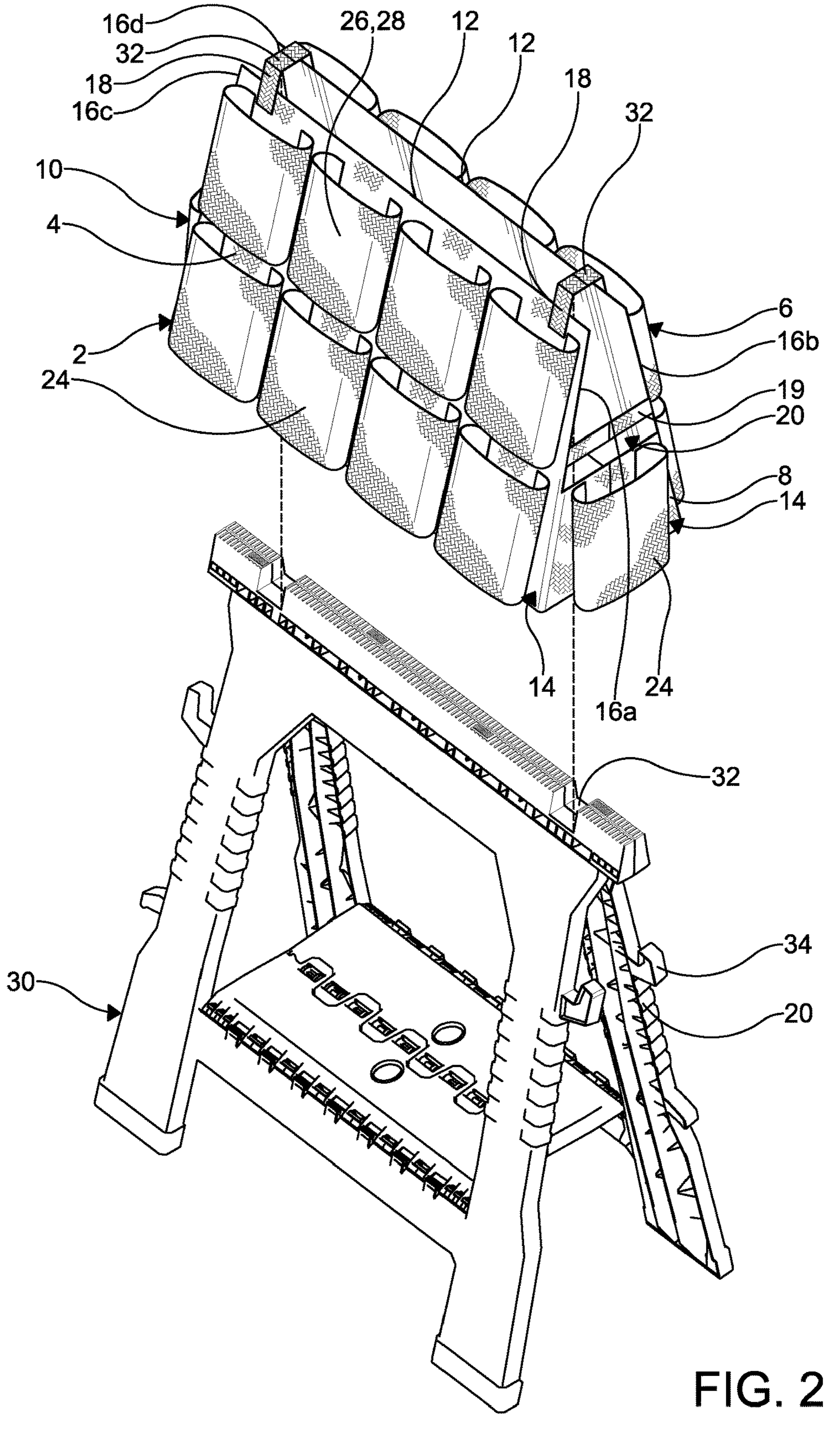
FIG. 2 is an exploded perspective view of the tool holder shown in FIG. 1, the tool holder disposed above the sawhorse.
Figure 3:
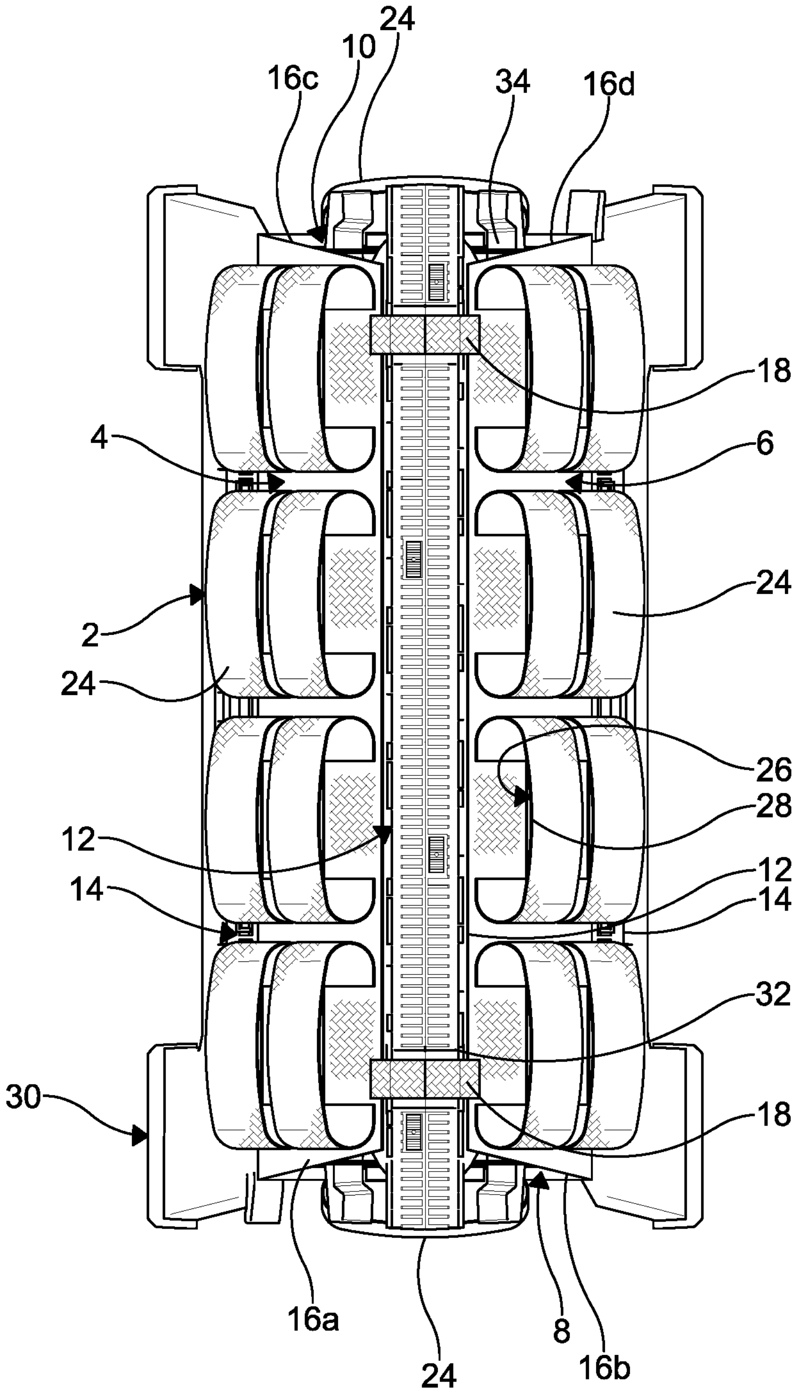
FIG. 3 is a top plan view of the tool holder and sawhorse shown in FIG. 1.
Figure 4:
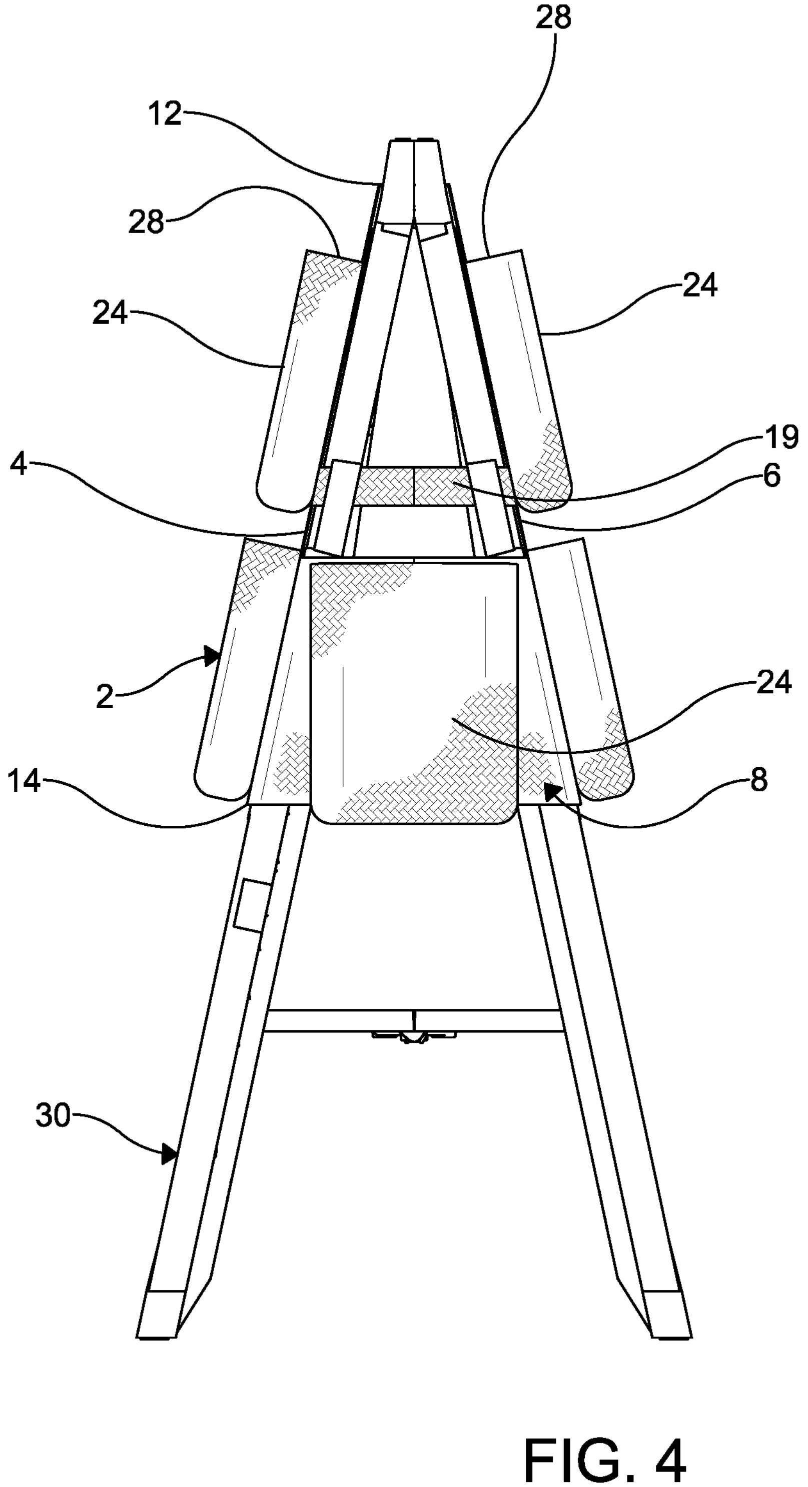
FIG. 4 is a side elevational view of the tool holder and sawhorse shown in FIG. 1, and further depicting a side of the tool holder having a single pocket attached thereto.

An at least one strap 18 is disposed adjacent a top of the sawhorse and connects the first side 4 to the second side. As shown in FIGS. 1 and 2, the tool holder 2 may include a plurality of the straps 18. A first pair of the straps 18 connect the top edge 12 of the first side 4 to the top edge 12 of the opposing second side 6, wherein the first pair of the straps 18 is configured to function as a hinge to allow the first side 4 and the second side 6 of the tool holder 2 to selectively converge and diverge to move the tool holder 2 between an expanded position and a collapsed position, for example, as the sawhorse 30 itself is moved between the expanded position and the collapsed position while the tool holder 2 is disposed on the sawhorse 30.

Referring again to FIGS. 1-5, the tool holder 2 may in particular include a second pair of the straps 19 disposed adjacent ends of the sawhorse. A first one the second pair of straps 19 connects the first end 16*a* of the first side 4 to the first end 16*b* of the second side. A second one of the second pair of straps 19 connects the second end 16*c* of the first side 4 to the second end 16*d* of the second side 6.

In a first embodiment, shown in FIG. 1, the second pair of straps 19 is spaced vertically from top edges of the each of the third side 8 and the fourth side 10, and an opening 20 is formed intermediate the sides and the straps 18. In a second embodiment, shown in FIG. 5, the third side 8 and the second side 10 of the tool holder span an entirety of the ends 16*a-d* of the first side 4 and the second side 6. In this embodiment, the second pair of straps 19 discussed in respect to the embodiment shown in FIGS. 1-4 is not provided.

Figure 5:
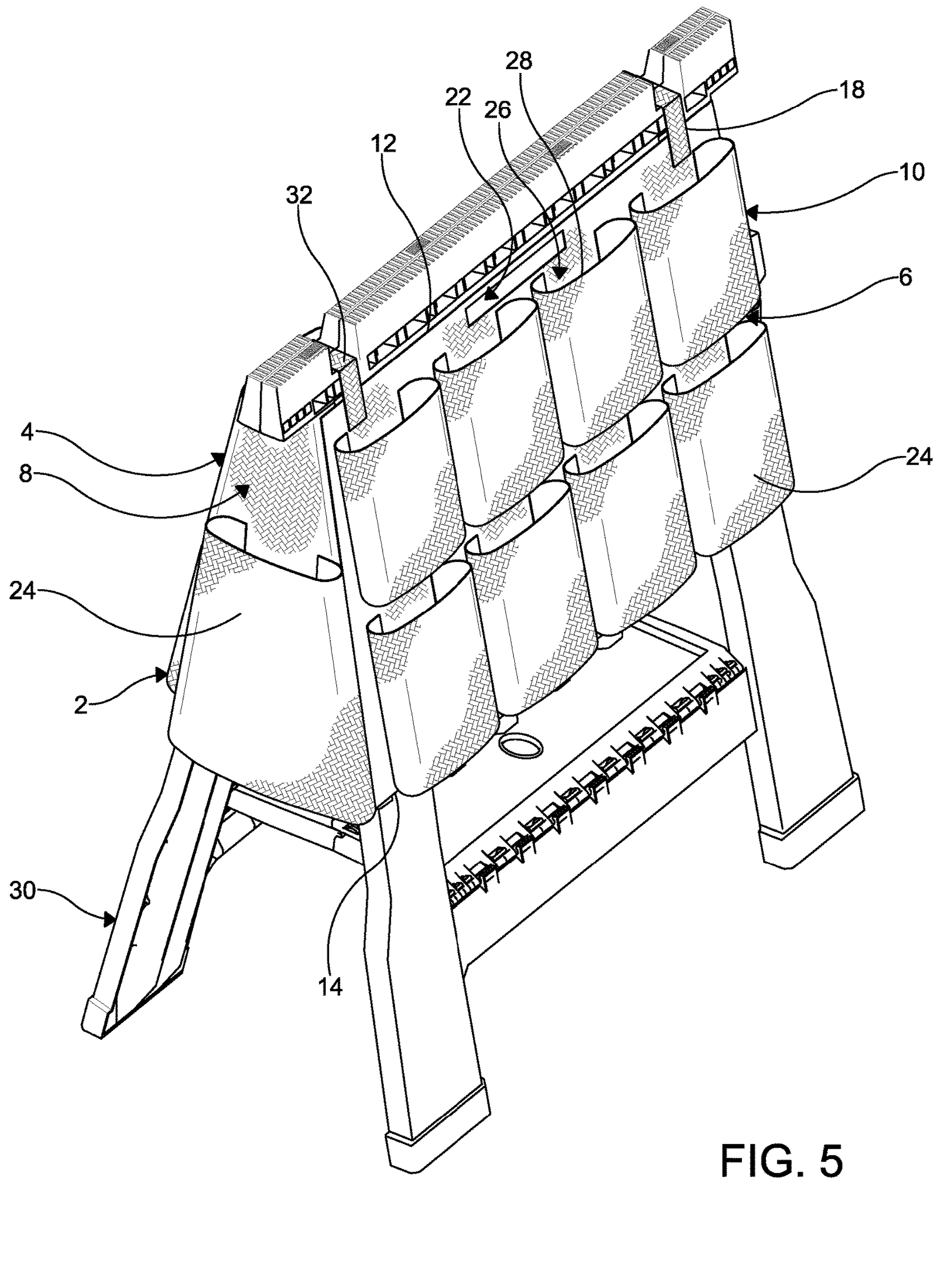
FIG. 5 is a perspective view of a tool holder according to another embodiment of the instant disclosure; the tool holder fitted to a collapsible sawhorse and having a handle that facilitates a carrying of the tool holder.

As also shown in FIG. 5, the first side 4 and the second side 6 of the tool holder 2 may further include a handle 22 formed therein. As illustrated, the handle 22 is formed adjacent the top edge 12 of each of the first side 4 and the second side 6. The handle 22 facilitates a lifting of the tool holder 2 to and from the sawhorse.

With renewed reference to FIGS. 1-5, each of the sides 4, 6, 8, 10 has at least one pocket 24 attached thereto. In the illustrated embodiment, each of the first side 4 and the second side 6 has a plurality of the pockets 24. Each of the third side 8 and the fourth side 10 has a single pocket 24. In alternative embodiments (now shown), the sides 4, 6, 8, 10 may include more or fewer pockets 24 attached thereto, as desired.

The pockets 24 of the tool holder 2 are attached to an outer face of the sides 4, 6, 8, 10, and include a cavity 26 formed therein. In the illustrated embodiment, the cavity 26 is formed between the pocket 24 and the outer face of the sides 4, 6, 8, 10. A perimeter of the pocket 24 is partially attached to the outer face, and the top portion of the perimeter of the pocket 24 is unattached to form an opening 28 to the cavity 26. In alternate embodiments, the cavity 26 may be formed entirely within the pocket 24. It should be appreciated that various suitable means, including but not limited to stitching and sonic welding, may be used to connect the pockets 24 to the outer face of the sides 4, 6, 8, 10 of the tool holder 2, within the scope of the disclosure.

In operation, the tool holder 2 may be configured for use on a trapezoidal shaped support structure, such as a sawhorse 30. The tool holder 2 is configured in an expanded position by diverging the first side 4 from the second side 6. In the expanded position, the bottom edges 14 of the first side 4 and the second side 6 are spaced apart from each other to form an unobstructed space therebetween. The tool holder 2 is then lowered onto the sawhorse 30, wherein the sawhorse 30 is received through the unobstructed space.

As the tool holder 2 is lowered onto the sawhorse 30, the first pair of straps 18 are received by a top surface of the sawhorse 30 to provide vertical support for the tool holder 2. In the illustrated embodiment, the top surface of the sawhorse 30 includes a pair of channels 32 formed therein for this purpose. The first pair of the straps 18 are configured to be received in the channels 32 of the sawhorse 30. By configuring the straps 18 to be received in the channels 32, the horizontal position of the tool holder 2 on the sawhorse 30 is ensured during use.

In one embodiment of the disclosure, shown in FIGS. 1-4, protrusions 34 formed on ends of the sawhorse 30 are received through the openings 20 formed between the second pair of straps 19 and the third side 8 and the fourth side 10, respectively. Each of the second pair of straps 19 is supported by at least one of the protrusions 34. This arrangement further facilitates the vertical support for the tool holder on the sawhorse 30.

With the tool holder 2 installed on the sawhorse 30, it should be understood that the pockets 24 of the tool holder 2 are readily accessible to a user.

Upon completion of a task, the tool holder 2 may be removed from the sawhorse 30 by lifting the tool holder 2 from the sawhorse 30. The tool holder 2 may then be collapsed or folded to a collapsed position, wherein the bottom edges 14 of the first side 4 and the second side 6 are disposed adjacent each other, and a cross section of the tool holder 2 is minimized. Alternatively, the tool holder 2 may remain on the sawhorse 30, and be folded to the collapsed position when the sawhorse 30 is collapsed for storage.

Although not shown, a plurality tools and supplies may be stored in the pockets of the tool holder during use.

While certain representative embodiments and details have been shown for purposes of illustrating the invention, it will be apparent to those skilled in the art that various changes may be made without departing from the scope of the disclosure, which is further described in the following appended claims.

What is claimed is:

1. A tool holder, comprising:

a plurality of sides including a first side, a second side, a third side, and a fourth side, each of the first side and the second side having a free top edge, a bottom edge, a first end edge, and a second end edge, the free top edge of the first side spaced apart from the free top edge of the second side, the third side disposed intermediate and connecting the first end edges of the first side and the second side, and the fourth side disposed intermediate and connecting the second end edges of the first side and the second side;

at least one pocket attached to at least one of the sides;

a first strap directly attached to the free top edge of each of the first side and the second side, and the first strap is laterally spaced apart from the first end edge;

a second strap directly attached to the free top edge of each of the first side and the second side, and the second strap is laterally spaced apart from the second end edge; and wherein the tool holder is configured to be disposed over a sawhorse and is movable between an expanded position and a collapsed position.

2. The tool holder of claim 1, wherein the entirety of each of the first end edges and the second end edges of the first side and the second side is connected to the third side or the fourth side.

3. The tool holder of claim 2, wherein the first strap and the second strap are disposed in channels formed at a top of the sawhorse.

4. The tool holder of claim 3, wherein the first strap and the second strap are oriented orthogonal to each of the free top edges of the first side and the second side.

5. The tool holder of claim 1, wherein the first strap is laterally spaced apart from the second strap, and the free top edges of the first side and the second side are not otherwise connected.

6. The tool holder of claim 1, wherein the sides and the at least one pocket are formed from a flexible thermoplastic material.

7. The tool holder of claim 1, wherein each of the first side and the second side has a handle hole formed therein adjacent to the free top edge of each of the first side and the second side.

8. The tool holder of claim 1, wherein the at least one pocket includes a plurality of pockets disposed on the first side, a plurality of pockets disposed on the second side, and one pocket formed on each of the third side and the fourth side.

9. The toolholder of claim 1, wherein the first strap and the second strap are each configured to be disposed within a channel formed in an upper surface of the sawhorse, the channel further configured to receive a cross member for a work surface in addition to one of the first strap and the second strap.

10. A tool holder, comprising:

a plurality of sides including a first side, a second side, a third side, and a fourth side, each of the first side and the second side having a free top edge, a bottom edge, a first end edge, and a second end edge, the free top edge of the first side spaced apart from the free top edge of the second side, the third side disposed intermediate and connecting the first end edges of the first side and the second side, and the fourth side disposed intermediate and connecting the second end edges of the first side and the second side;

a plurality of pockets attached at least one of the sides;

a first strap directly attached to the free top edge of each of the first side and the second side, and connecting the first side and the second side, and the first strap is laterally spaced apart from the first end edge;

a second strap directly attached to the free top edge of each of the first side and the second side, and connecting the first side and the second side, the second strap laterally spaced apart from the first strap, and the second strap is laterally spaced apart from the second end edge; and wherein the tool holder is configured to be disposed over a sawhorse and is movable between an expanded position and a collapsed position.

11. The tool holder of claim 10, wherein the entirety of each of the first end edges and the second end edges of the first side and the second side is connected to the third side or the fourth side.

12. The tool holder of claim 11, wherein the first strap and the second strap are oriented orthogonal to each of the free top edges of the first side and the second side.

13. The tool holder of claim 10, wherein the sides and the pockets are formed from a flexible thermoplastic material.

14. The tool holder of claim 10, wherein each of the first side and the second side has a handle hole formed therein adjacent to the free top edge of each of the first side and the second side.

15. The toolholder of claim 10, wherein the first strap and the second strap are each configured to be disposed within a channel formed in an upper surface of the sawhorse, the channel further configured to receive a cross member for a work surface in addition to one of the first strap and the second strap.

16. A sawhorse system, comprising:

a sawhorse having a pair of spaced-apart channels formed in an upper surface thereof; and a tool holder, having a plurality of sides including a first side, a second side, a third side, and a fourth side, each of the first side and the second side having a free top edge, a bottom edge, a first end edge, and a second end edge, the free top edge of the first side spaced apart from the free top edge of the second side, the third side disposed intermediate and connecting the first end edges of the first side and the second side, and the fourth side disposed intermediate and connecting the second end edges of the first side and the second side, at least one pocket attached to at least one of the sides, a first strap directly attached to the free top edge of each of the first side and the second side and the first strap is laterally spaced apart from the first end edge, a second strap directly attached to the free top edge of each of the first side and the second side and the second strap is laterally spaced apart from the second end edge; and wherein the tool holder is configured to be disposed over a sawhorse wherein the first strap and second strap are each disposed in one of the channels formed in the upper surface of the sawhorse, and the tool holder is movable between an expanded position and a collapsed position wherein the tool holder is disposed over the sawhorse and is movable between an expanded position and a collapsed position.

17. The sawhorse system of claim 16, wherein the sides and the pockets are formed from a flexible thermoplastic material.

18. The sawhorse system of claim 16, wherein the first strap and the second strap are disposed in channels formed at a top of the sawhorse.

19. The sawhorse system of claim 16, wherein each of the first side and the second side has a handle hole formed therein adjacent to the free top edge of each of the first side and the second side.

20. The sawhorse of claim 16, wherein each of the channels is further configured to receive a cross member for a work surface in addition to one of the first strap and the second strap.

* * * * *